United States Patent
Daly

[11] Patent Number: 5,905,819
[45] Date of Patent: May 18, 1999

[54] METHOD AND APPARATUS FOR HIDING ONE IMAGE OR PATTERN WITHIN ANOTHER

[75] Inventor: Scott J. Daly, Scottsville, N.Y.

[73] Assignee: Eastman Kodak Company, Rochester, N.Y.

[21] Appl. No.: 08/596,818

[22] Filed: Feb. 5, 1996

[51] Int. Cl.⁶ .............................. G06K 9/36; G06K 9/38; G06K 9/40; G06K 9/46

[52] U.S. Cl. .................... 382/284; 382/232; 382/260; 382/270; 358/426; 358/456; 358/501; 358/532

[58] Field of Search .................... 382/284, 270, 382/260, 232; 358/426, 456, 501, 532

[56] References Cited

U.S. PATENT DOCUMENTS

| | | | |
|---|---|---|---|
| 4,774,574 | 9/1988 | Daly et al. | 348/406 |
| 5,091,966 | 2/1992 | Bloomberg et al. | 382/203 |
| 5,128,525 | 7/1992 | Stearns et al. | 235/454 |
| 5,168,147 | 12/1992 | Bloomberg | 235/456 |
| 5,221,833 | 6/1993 | Hecht | 235/494 |
| 5,245,165 | 9/1993 | Zhang | 235/454 |
| 5,323,247 | 6/1994 | Parker et al. | 358/456 |
| 5,327,254 | 7/1994 | Daher | 358/426 |
| 5,347,590 | 9/1994 | Nonnweiler et al. | 382/260 |
| 5,394,483 | 2/1995 | Daly | 382/270 |
| 5,521,723 | 5/1996 | Madden et al. | 358/501 |
| 5,557,429 | 9/1996 | Hirose | 358/532 |
| 5,636,292 | 6/1997 | Rhoads | 382/232 |

FOREIGN PATENT DOCUMENTS

| | | |
|---|---|---|
| 0 493 091 (A1) | 7/1992 | European Pat. Off. |
| 0 581 317 (A2) | 2/1994 | European Pat. Off. |

OTHER PUBLICATIONS

Matsui, et al "Video–Steganography: How to Secretly Embed a Signature in a Picture", the Journal of the Interactive Multimedia Association Intellectual Property Project, vol. 1, issue 1, Jan. 1994.

Walter Bender et al., "Techniques for Data Hiding", Feb. 1995, From the Proceedings of the SPIE, 2420:40, pp. 1–10.

Primary Examiner—Leo H. Boudreau
Assistant Examiner—Daniel G. Mariam
Attorney, Agent, or Firm—Thomas H. Close

[57] ABSTRACT

A method of hiding a first image in a second image to produce a combined image includes the steps of: a) modifying the first image according to the content of the second image, so that when the modified first image is added to the second image to produce the combined image, no visible differences will exist between the second image and the combined image; and b) adding the modified first image to the second image to produce the combined image.

22 Claims, 10 Drawing Sheets

METHOD AND APPARATUS FOR HIDING ONE IMAGE OR PATTERN WITHIN ANOTHER

CROSS REFERENCE TO RELATED APPLICATIONS

The present application is related to U.S. application Ser. No. 08/565,804, filed Nov. 30, 1995, by Scott J. Daly et al., and entitled "Method for Embedding Digital Information in an Image".

FIELD OF THE INVENTION

This invention relates to the field of digital imaging, and more specifically to the fields of Data Embedding in images, and towards hiding one image or pattern within another.

BACKGROUND OF THE INVENTION

There arise applications in digital imaging where one may want to hide one image within another. The foremost example of this is the field of data hiding, where the goal is to make an image more useful by enabling it with the ability to carry digital data as well as the actual image. Data hiding is more properly referred to as steganography from the Greek words steganos meaning covered and graphia meaning writing or representation. Steganography precedes the digital era and was generally a technique where written messages were first in drawings or paintings by obscuring them in the image's texture (such as vines) so that they could be read only if one knew where to look (often using a mirror). Recently, there has been a desire to hide a message in the form of a digital data sequence within an image. In this approach it is necessary to use a computer to read, or extract, the message. As a result, it is unreadable to the human eye. In all the forms of steganography, both antique and digital, the inclusion of the message results in a distortion of the original image. However, the goal is that the resulting distortion is undetectable to the human eye.

The applications where digital steganography is a potential solution include tamper proofing, digital watermark, image tagging, digital pointers, and data augmentation. Tamper proofing determines if a digital image has been manipulated from its original form and is useful for legal evidence and medical applications. The digital watermark establishes ownership and include applications of copyright protection in the form of either a notice or an actual usage prevention (such as digital copier automatically refusing to print an image with digital copyright notice embedded). Image tagging is an application where an owner gives an image or a sequence of images (i.e., a movie) to a number of distributors, and can place an individual tag on each image such that if the image is found, the distributor of the image can be identified. An example use of image tagging is in the prevention of bootlegged video movies.

Data Augmentation refers to hiding a digital message in an image that contains a description of the image analogous to a caption underneath a photo in a newspaper. A digital pointer refers to hiding a digital message whose contents are a pointer to a location such as a database or a site on the Internet where further information about the picture resides. This information can be similar to the idea of data augmentation, but can also be more encompassing. For example, it can include information on how to segment the image into different areas, information to associate with those areas, and other related images such as the same scene from a different view or with subjects having different expressions or even a higher quality version of the same image (e.g., one with higher resolution).

In the digital version of steganography, the desired distortion most often takes the form of a two dimensional pattern (See "Techniques for Data Hiding" by Bender et al. SPIE Proceedings 2420, 1995), and it is desirable to keep the pattern's contrast as high as possible in order to maintain a high signal to noise ratio. Here the first pattern fills the role of signal, and the image fills the role of noise, even though they look much the opposite to the observer. A high signal to noise ratio enables a decoder to extract the full bit capacity of a message contained in the first pattern. On the other hand, a competing desire is to keep the pattern's contrast as low as possible so that is not visible to the human eye in the image. If one tries to use a fixed pattern of a constant contrast, the specific details of the image such as background noise level in the image and image content (e.g. various edges and textures in the image) make it difficult, and generally impossible, to achieve the competing goals of having the decoder be able to detect a message contained in the first pattern while having the pattern be invisible to a human observer. As a result, the bit capacities of the data hiding techniques described by Bender are low and in some portions of images (i.e. uniform areas with low noise) the patterns will be visible.

Another collection of prior art accomplishes data hiding (5,091,966 issued 2/1992 to Bloomberg et al., 5,128,525 issued 7/1992 to Stearns et al., 5,168,147 issued 12/1992 to Bloomberg, 5,221,833 issued 6/1993 to Hecht, and 5,245,165 issued 9/1993 to Zhang), but it is limited to placing the data within uniform fields of color or gray value, or the special case of text characters, which can be considered as small and very controlled uniform fields. None of these approaches address the issue of how to hide a pattern or embed data in an existing photographic image or a computer generated graphic containing complex content.

The object of the present invention is to provide an improved method for hiding one digital image or pattern within another.

SUMMARY OF THE INVENTION

The object of the present invention is achieved by providing a method of hiding a first image in a second image to produce a combined image that includes the steps of: a) modifying the first image according to the content of the second image, so that when the modified first image is added to the second image to produce the combined image, no visible differences will exist between the second image and the combined image; and b) adding the modified first image to the second image to produce the combined image.

This method is useful in digital steganography and image compression. In a preferred embodiment, the method employs a mathematical model of the human visual system that includes a contrast attenuator that enables the first image to be modified in response to the local spatial and frequency content of the second image.

The present invention uses the human visual system model to force the first image to be invisible by specifically modifying it according to the human visual system model in the context of the second image. This means that to hide the first image within the second image, the specific cluster of frequencies present at any given spatial location of the second image is examined and the magnitudes of similar frequencies in the similar location of the first image are adjusted to be below the visual threshold.

DETAILED DESCRIPTION OF THE INVENTION

Figure 1:
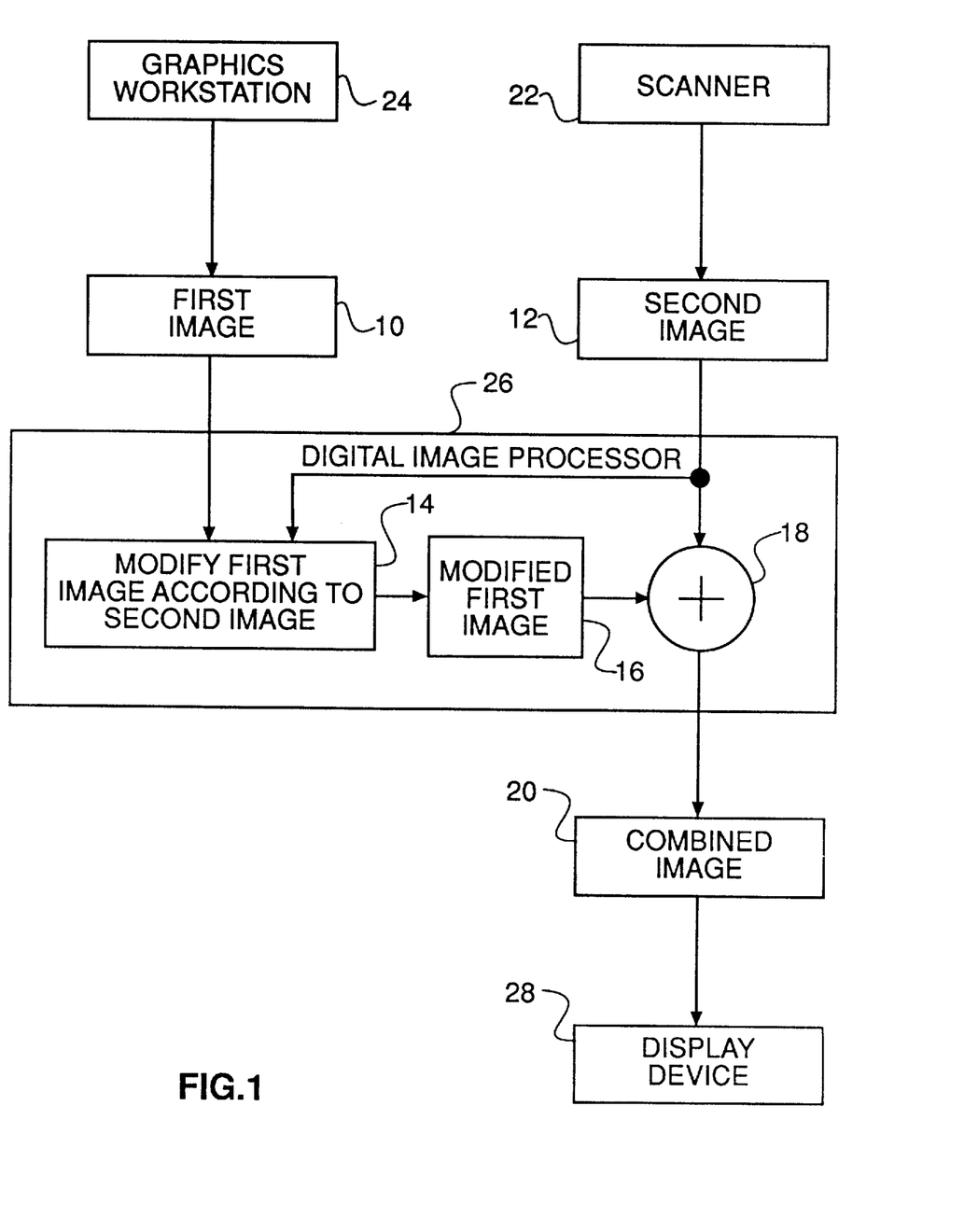
FIG. 1 is a generic schematic block diagram of the method of the present invention.

Referring to FIG. 1, according to the method of the present invention a first image 10 which is to be hidden in a second image 12, is modified 14 according to the contents of the second image to produce a modified first image 16 that will not be visible when combined with the second image. The modified first image 16 is then added 18 to the second image to produce a combined image 20. The first and second images 10 and 12 are preferably digital images. The first and second images 10 and 12 are produced from an input device, for example by scanning a photographic image in a scanner 22 or by generating a computer graphic image on a graphics workstation 24. The first image 10 may also be a pattern representing a digital data message, generated by the graphics workstation 24 or by another programmed computer. For example, the data image generated by the method disclosed in U.S. patent application Ser. No. 08/565,804, filed Nov. 30, 1995 by Daly et al. may comprise the first image 10. The first and second images may also be supplied from a digital storage device such as a magnetic or optical memory. The image processing steps are carried out in a digital image processor 26, such as a Sun Sparc5 workstation. Eventually, the combined image 20 will be displayed on a soft display device 28 such as a CRT or a hardcopy device such as a thermal, inkjet or digital silver halide printer.

According to the present invention, the first image 10 is locally modified depending on the exact details of the second image 12 in the digital image processor 26. A model of the human visual system is employed to perform this modification. The ability to model the human visual system has recently advanced to the state where it is possible to quantitatively predict the visibility of image distortions by treating the image as a 2-D waveform (See U.S. Pat. No. 5,394,483 issued Feburary 1995 to Daly).

The method described in the '483 patent uses an advanced model of the human visual system to determine whether a distortion produced in an image will be visible in the image. The distortion and the image are analyzed as collections of frequencies at each location in the image. The visibility of the distortion is determined with quantitative accuracy for each location in the image. This advanced model of the human visual system is employed in the present invention to modify the first image according to the content of the second image so that when the modified first image is added to the second image to produce a combined image, no visible differences will exist between the second image and the combined image.

Figure 2:
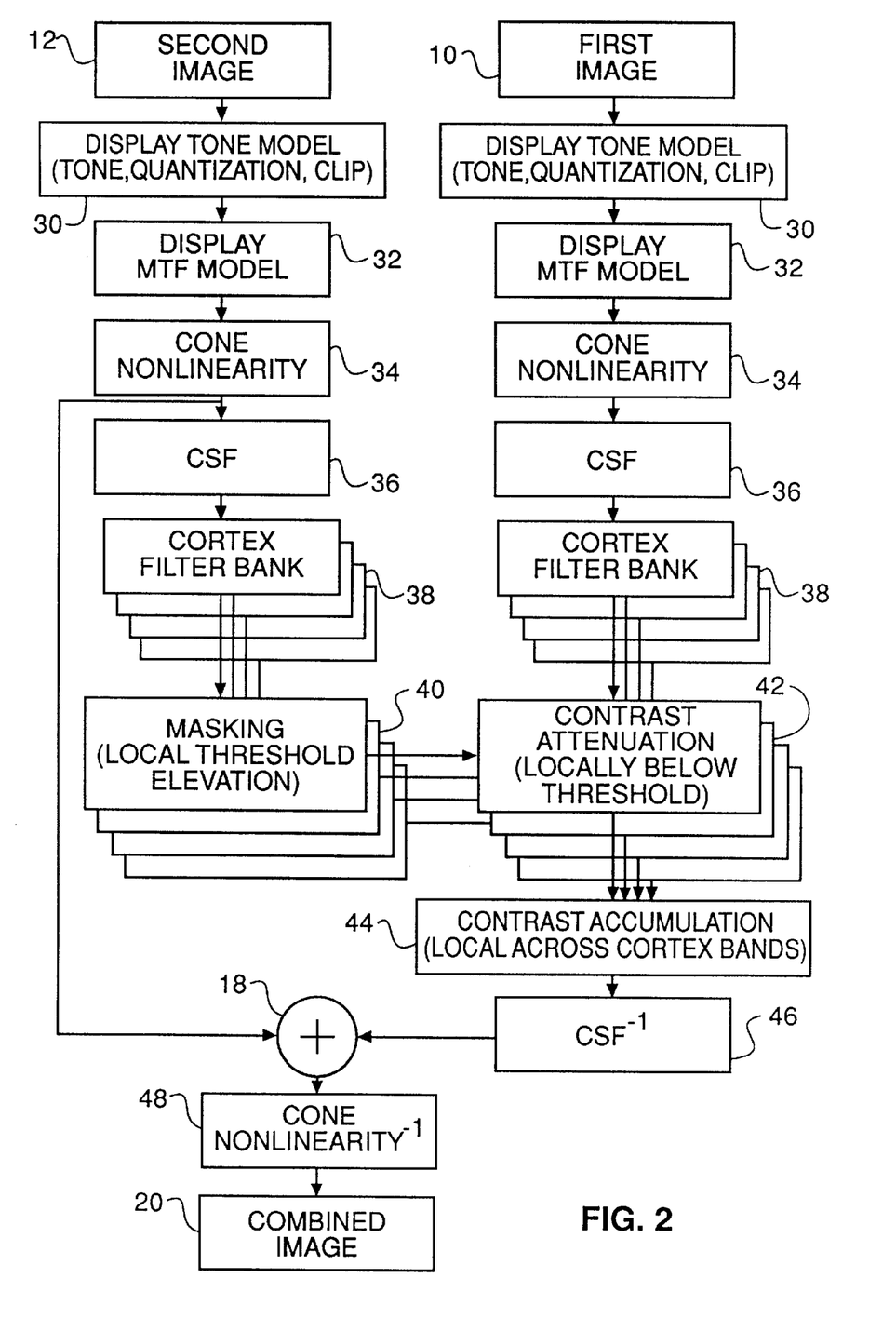
FIG. 2 is a schematic block diagram illustrating one specific embodiment of the present invention.

Referring to FIG. 2, a preferred embodiment of practicing the method of the present invention using the advanced model of the human visual system described in the '483 patent will now be described. The first and second images 10 and 12 are processed through a parallel series of image processing steps in order to first simulate the effect the display device 28 will impose on the images, and then to simulate the perception of the images by the human visual system.

The first step 30 in this process is to simulate the display system's tone scale response, which includes the quantization and clipping effects of the display. The next step 32 is to simulate the display's spatial effects as represented by the modulation transfer function (MTF) which describes the 2-D frequency response of the display. At this point the display has been simulated and the resulting images are a representation of the physical 2-D waveform of light intensities produced by the display. From here the steps simulate the effects of the human visual system. The first step 34 is to model the amplitude nonlinearity of the human retina, referred to as simply the cone nonlinearity. This is a simple pixel transformation may be accomplished, for example, with a look-up-table, since there are no spatial effects between different pixels. Alternatively, the transformation may be accomplished using an equation to compute the transformation.

The exact shape of the nonlinearity depends on the details of the viewing conditions such as overall light levels and is described in more detail in the '483 patent. The next step 36 is to simulate the image independent spatial effects of the human visual system, which are obtained from a model of the contrast sensitivity function of the eye (CSF). The details of this effect depend on such viewing conditions such as light levels, viewing distance, and size of the image. The model which simulates these effects is described in more detail in the '483 patent.

The next step 38 is to simulate the frequency decomposition of the cortex of the visual system with a set of spatial frequency filters. This effect results in the creation of one low-pass and a bank of band-pass filtered images (shown as multiple boxes for this step in the Figure). These are referred to as cortex filtered images and the filters used to create them are referred to as cortex filters. The exact number of filtered images is not critical, although the best performance occurs with about 31 filters as described in detail in the '483 patent. For each of these cortex filtered images resulting from the second image 12, a masking image representing a degree of masking as a function of location is created in step 40, this step is described in more detail in the '483 patent. Threshold elevation is the relative increase in visible threshold above that which would occur in a uniform field; this effect is commonly known as masking. The masking image describes the threshold elevation as a function of position and spatial frequency within the image.

For the cortex filtered images resulting from the first image 10, the contrast is locally attenuated in step 42 as a function of the degree of masking for the corresponding cortex filtered image resulting from the second image 12. This step is described in more detail below with reference to FIG. 3. The result is a new bank of cortex filtered images derived from the first image that will be below the visual threshold of the second image at each location within the second image. The new bank of cortex filtered images are accumulated in step 44 to substantially return the modified first image to the original spatial domain. This is essentially undoing step 38 after contrast attenuation. The modified first image is further returned to the original domain in step 46, by applying a filter that is the inverse of the CSF.

At this point the modified first image is combined 18 with a version of the second image which has been brought into the visual nonlinear domain (by steps 30, 32 and 34). Note that if the combination of the images is performed in a nonlinear domain such as the log domain or the cone nonlinear domain it will be an addition. If the images are combined in a linear domain the combination will be effected by multiplication. This is because multiplication is simply an addition in the log domain (which is commonly used in images and referred to as density).

The final step is to return 48 the combined modified first and second images (which are now in a visual nonlinear domain) back into the physical image domain by using the inverse function of the cone nonlinearity to produce the final combined image 20. By using the method of the present invention, the modified first image will not cause a visible distortion of the second image for the viewing conditions specified by the components of the visual model used in steps 34 and 36.

Figure 3:
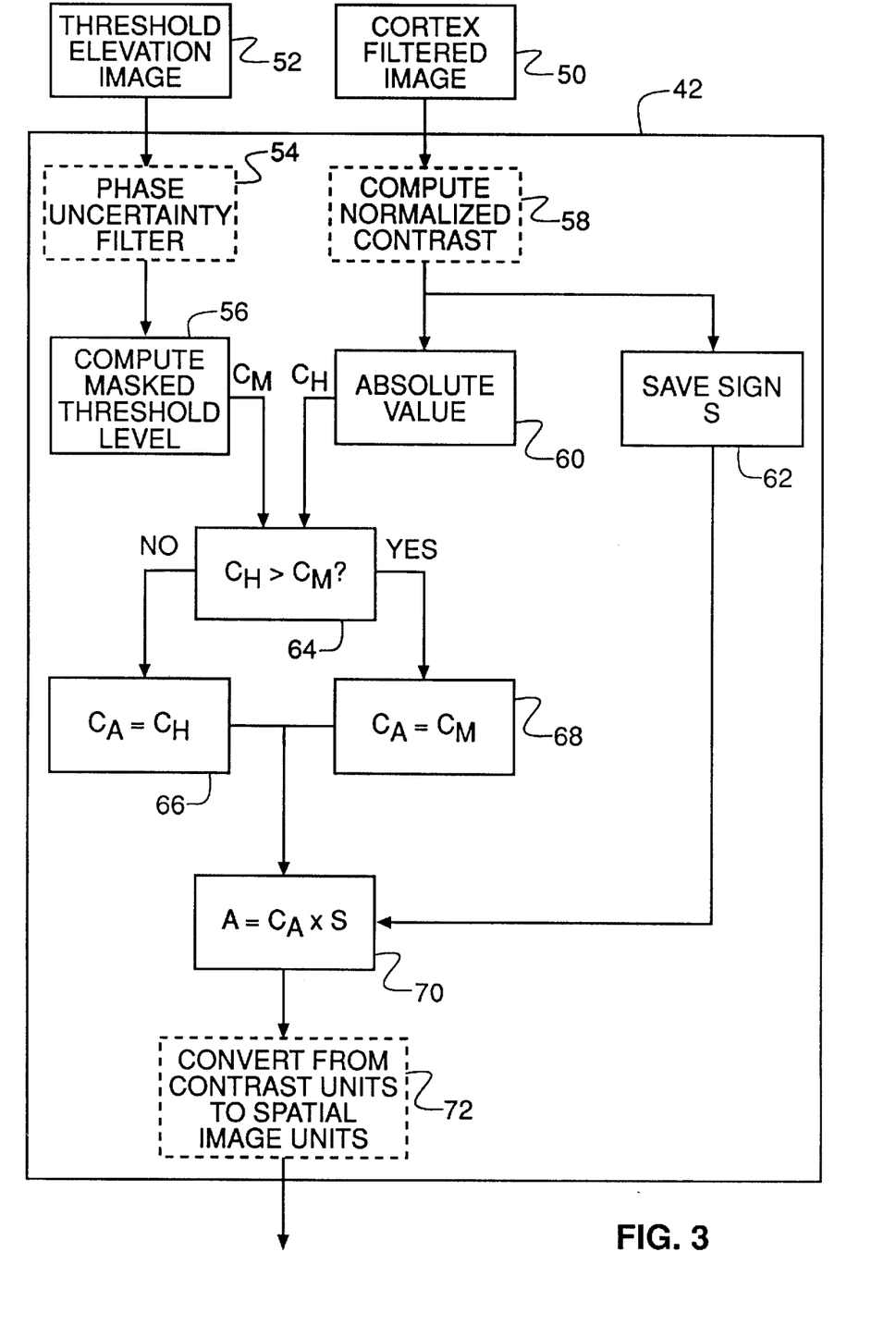
FIG. 3 is a detailed block diagram showing the Contrast Attenuation step shown in FIG. 2.

FIG. 3 is a diagram of the details of the Contrast Attenuation step 42 of FIG. 2. The details of this step are repeated for each cortex filtered image 50 created in step 38 from the first image 10. The other input to this step is the corresponding masking image 52, which resulted from the second image 12 and shows the level of masking occurring in the second image as a function of location and frequency band. Optionally, a low-pass filter 54 may be applied to the masking image to simulate the phase uncertainty of the visual system. The use of this low-pass filter results in an accuracy versus computational complexity trade-off and is described in the '483 patent.

The next step 56 applied to the masking image 52 computes a maximum allowable local contrast $C_M$ (for the cortex filter band and the location in the image) calculated as:

$$C_M = \frac{1}{T_E P_C}, \qquad (1)$$

where $T_E$ is the threshold elevation within the cortex filtered image generated from the second image, and $P_C$ is the psychometric function cutoff. The psychometric function cutoff represents the maximum allowed probability of detection of the first image in the second image, e.g. .5. The particular units of contrast are not important, as long as they are the same units of contrast as output in step 58 below.

Optionally, the contrast of the cortex filtered image 50 may be normalized 58 and the contrast normalized image used in place of the cortex filtered image 50. Next, because the cortex filtered images have a mean pixel value of zero, the absolute value of each pixel in the image is taken 60 and the sign of each pixel is saved 62.

In step 64, the absolute value of the cortex filtered image, $C_H$ is compared pixel by pixel to the maximum allowable local contrast $C_M$. If the existing contrast $C_H$ in the first image is not greater than the maximum allowable local contrast $C_M$ allowed by masking, it is allowed to remain and the allowed contrast amplitude $C_A$ is assigned this value in step 66. If the existing contrast $C_H$ is greater than the contrast allowed by masking, $C_M$, the allowed contrast amplitude is assigned the maximum value, $C_A = C_M$ in step 68. In step 62, the sign of the local pixel contrast, S, was saved prior to the absolute value operation, and now that the amplitude of the local pixel contrast is determined in steps 66 and 68, the next step 70 is to provide the proper sign to the pixel's amplitude $C_A$, by multiplying $C_A$ by S. The final step 72 in the contrast attenuation step is optional, and that is to convert back from normalized contrast units to spatial units if the conversion to normalized contrast units was made in optional block 58.

Figure 4:
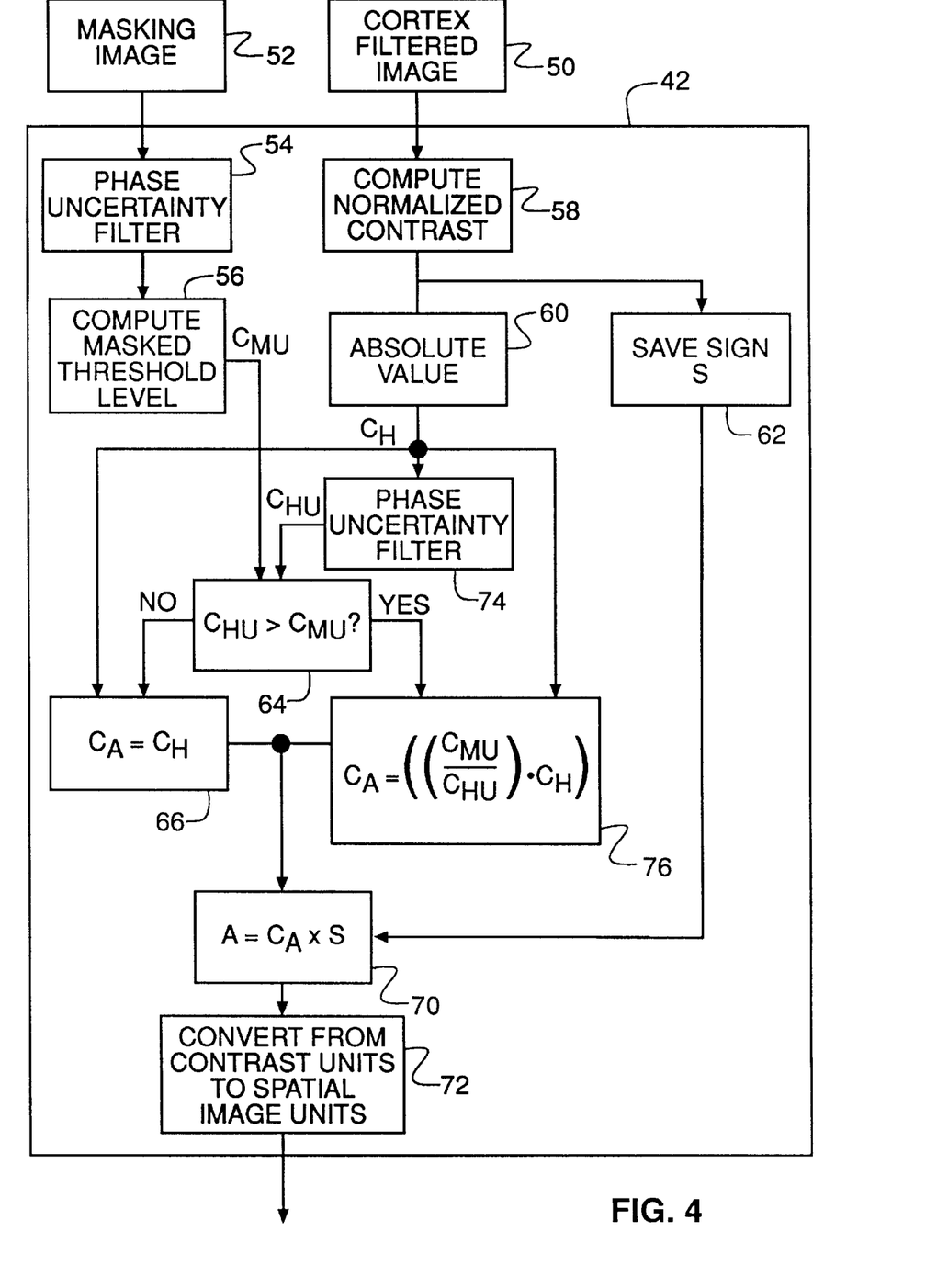
FIG. 4 is a detailed block diagram of an alternative method of performing the Contrast Attenuation step shown in FIG. 2.

FIG. 4 shows a detailed diagram of an alternative contrast attenuation procedure 42. The procedure begins with the masking image 52 and applies the low-pass filter 54 (phase uncertainty filter), which is not optional in this implementation. A similar low-pass filter 74 is applied to the absolute value contrast image for the cortex frequency band of the first image. It generally has the same parameters as the filter 54, but it need not. The remaining steps in this method are similar to those described in FIG. 3, except that the step of assigning the allowed contrast amplitude, step 76, multiples the initial contrast in the first image which is output from step 60 by a scale factor $C_{MU}/C_{HU}$; that is, it reduces the amplitude $C_H$ by the scale factor $(C_{MU}/C_{HU})$ necessary to keep the amplitude less than the maximum allowable local contrast $C_{MU}$ over a locally broader range than as occurs in FIG. 3. The final steps 70 and 72 are the same as FIG. 3.

Figure 5:
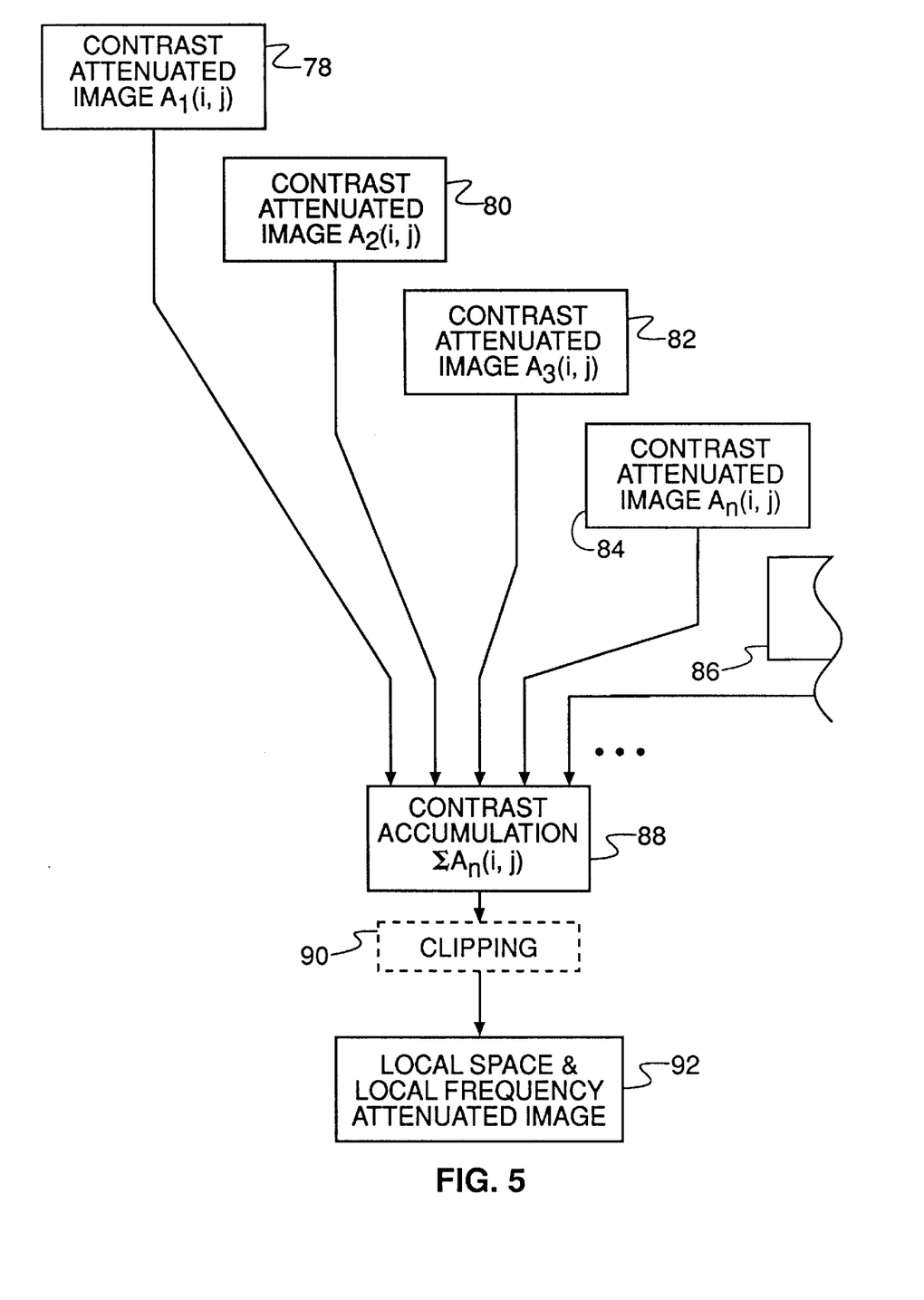
FIG. 5 is a block diagram showing the Contrast Accumulation step shown in FIG. 2.

FIG. 5 shows a detailed diagram of the contrast accumulation step 44 shown in FIG. 2. It takes input from the contrast attenuated images $A_n(i,j)$ 78, 80, 82, 84, 86, etc. resulting from the contrast attenuation steps 42 shown in FIG. 2 and detailed in FIGS. 3 and 4. There is a contrast attenuated image for each band n in the cortex filter bank 38. These are accumulated in step 88, which adds the pixels across all bands at a single location into a summation image $\Sigma A_n(i,j)$.

For the case where the local contrast of the entire first image lies below the maximum allowable threshold, then the first image is not changed and the result of the summation in step 88 is the same image resulting as the output of step 36 for the first image in FIG. 2. If the summed value exceeds the dynamic range of the desired output, an optional clipping step 90 may be employed to restrict the range of the pixel values in the modified first image. This will rarely be necessary since all the modifications made to the first image are in the form of a contrast attenuation, rather than a contrast increase. The output of this step is the modified first image 92 which has been attenuated in the local spatial and frequency domains, based on the contents in the second image 12. The result is that this modified first image can now be added to the second image and no distortions will be visible to the human eye.

Figure 6:
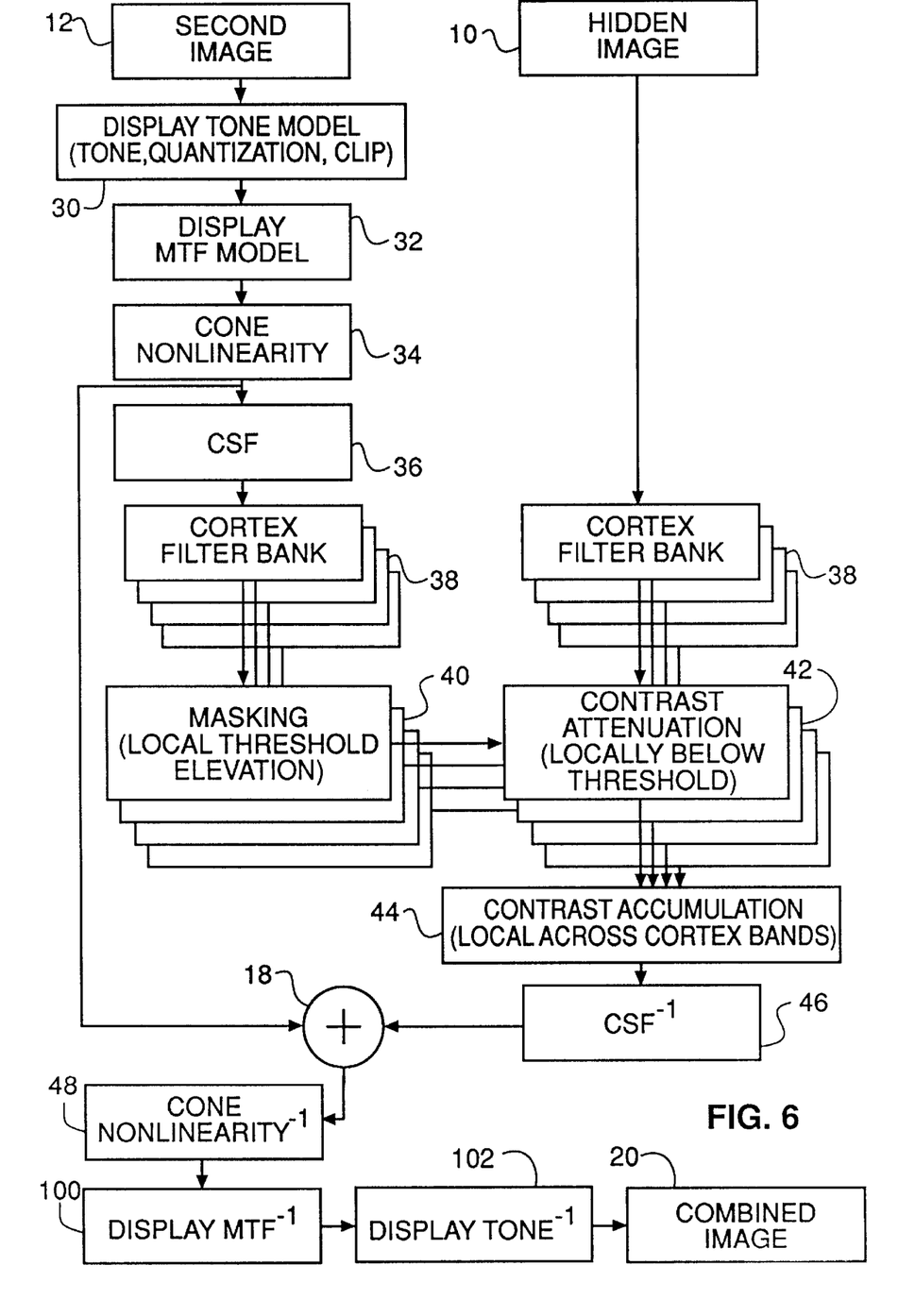
FIG. 6 is a block diagram of an alternative embodiment of the present invention.

FIG. 6 shows an alternative method of hiding a first image within a second image, wherein the first image is already assumed to be in the visual domain. This version is useful for applications where the first image is a pattern representing digital data, as opposed to another photographic image. It has the advantages of preserving high frequencies (they are not modified by a CSF filter 36 prior to the contrast accumulation step 44) and a slightly lower computational load for the hiding process (basically steps 30–36 for the first image shown in FIG. 2 are omitted).

The step after the addition 18 of the modified first image to the second image is to convert 48 the combined image from a domain corresponding to the visual nonlinearity to a domain common for imaging device representation (e.g., density or reflectance). After this, the steps include undoing the display MTF in step 100, and undoing the display tone scale in step 102 in order to return the combined image to its proper appearance.

Figure 7:
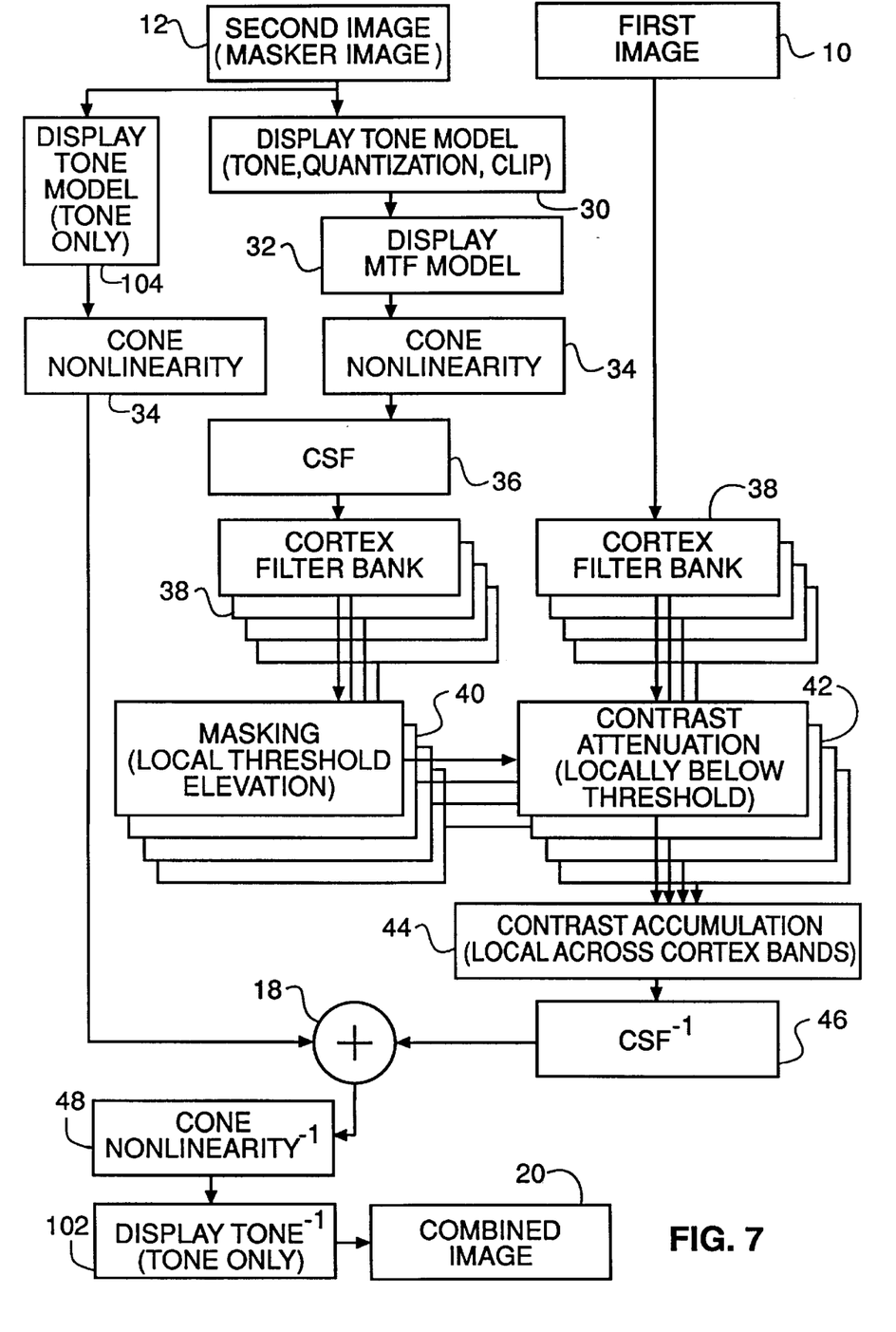
FIG. 7 is a block diagram of a further alternate embodiment of the present invention.

FIG. 7 shows an alternative method over that of FIG. 6 where some computational burdens are removed at the expense of accuracy. Of all the steps after the addition 18, the most cumbersome is the inverse filtering of the display MTF (step 100 in FIG. 6).

In a steganography application, any steps after the addition 18 must also be applied (in an inverse fashion) in the decoder. Consequently the alternate method of FIG. 7 dispenses with the compensation for the display MTF after step 18. As a result, a different path must be taken for the second image that is added to the first image at 18 than the path for the generation of the maximum allowable local contrast image in step 40. This new pathway includes the separate simulation 104 of the display tone scale and the cone nonlinearity 34, respectively. The tone model used in step 104 does not include the quantization and clipping steps used in the display tone model of step 30, thereby avoiding contouring artifacts due to multiple quantization of the image.

The steps after the addition 18 include applying the inverse of the amplitude nonlinearity 48 to the combined image and re-calibrating 102 the combined image back to the display space. These steps are simple operations which can be combined in a single look-up-table. Thus in a steganography application, the decoder only has to simulate steps 104 and 34 prior to its normal processing as described below with reference to FIG. 9.

Figure 8:
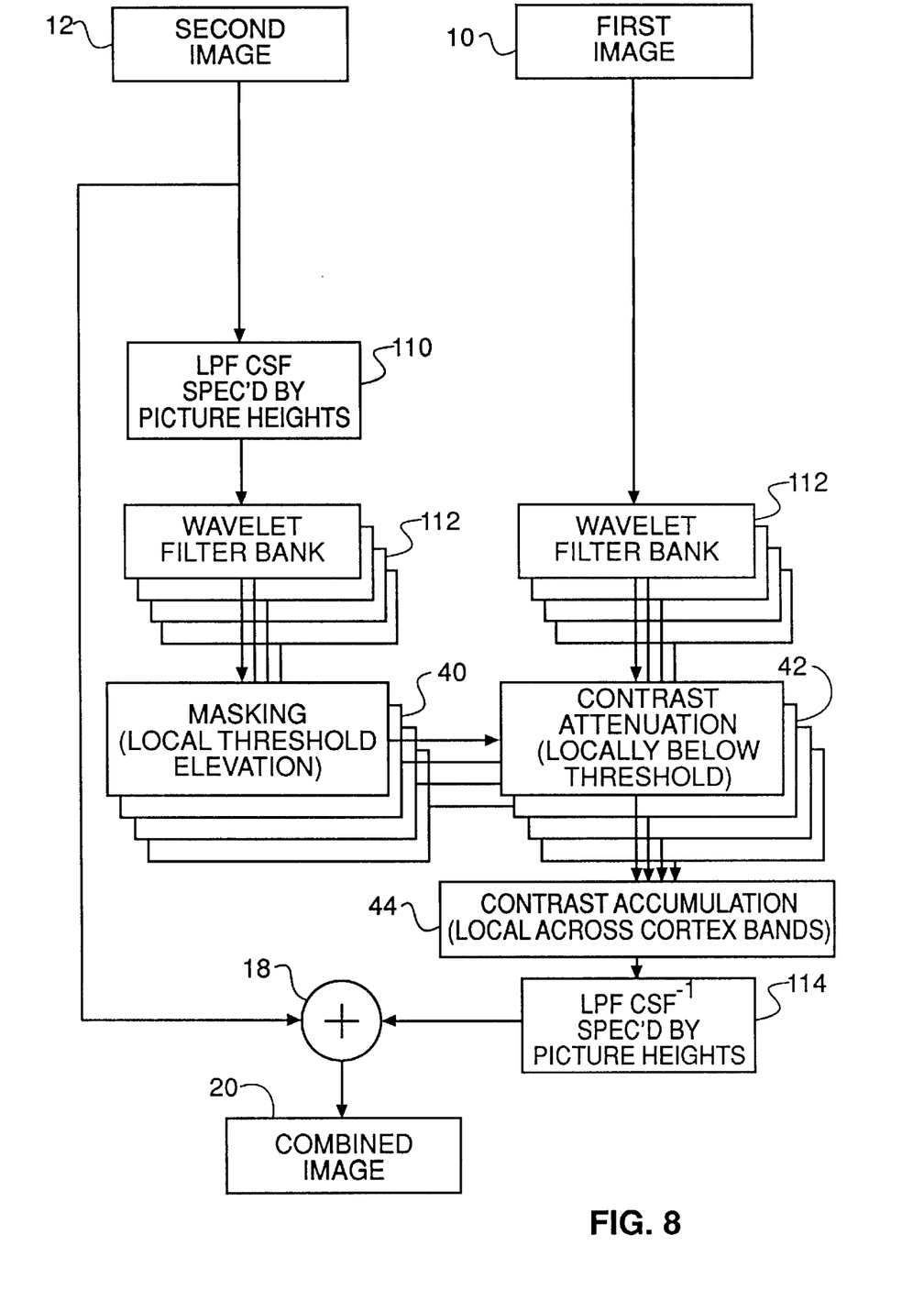
FIG. 8 is a block diagram of a still further alternate embodiment of the present invention.

FIG. 8 shows a further alternate method over FIG. 2, where several assumptions are made for the sake of computational efficiency. The first assumption is that the image is in a gray-level domain that is already close to the gray-level domain of the cone nonlinearity. The common CRT gamma domain is a good example of such a domain. Thus we do not need to convert from the initial domain of the image to the visual domain (carried out by steps 34 in FIG. 2). Another assumption is that the display has no spatial effects on the image, thus we do not need to simulate such effects prior to entering the visual model, consequently step 32 of FIG. 2 is omitted. These assumptions also allow steps 48, 100, and 102 of FIG. 6 to be omitted, so that there is no processing after the addition of the second image to the modified first image. This results in the further advantage that the decoder does not have to perform any of these steps either. Further, the CSF is restricted to a low-pass version 110, and its viewing distance parameters can be specified in units of the image's picture heights. As a result of this feature and the removal of the display tone and MTF, we have a version of the method which is well suited where no information is available about the display, and the only assumption is that the viewer will view the image from a number of picture heights. Rather than using the cortex transform for creating a filter bank, this approach uses a wavelet filter bank 112, which saves further computational complexity. Steps 40 and 44 are the same as in the method of FIG. 2. The inverse CSF post-filter 114 is specified in terms of picture heights of intended viewing distance.

Finally the unmodified second image 12 is added to the modified first image to create the embedded image in step 18. The advantages of this method come at the expense of a less accurate hiding process. This results in either visible artifacts in the embedded image or a situation in which the first image has lower overall contrast than if a more accurate method had been used. The lower overall contrast will make it more difficult for the decoder to extract data in steganography applications, and the visibility of the first image has the drawback of reducing the image quality of the combined image.

Figure 9:
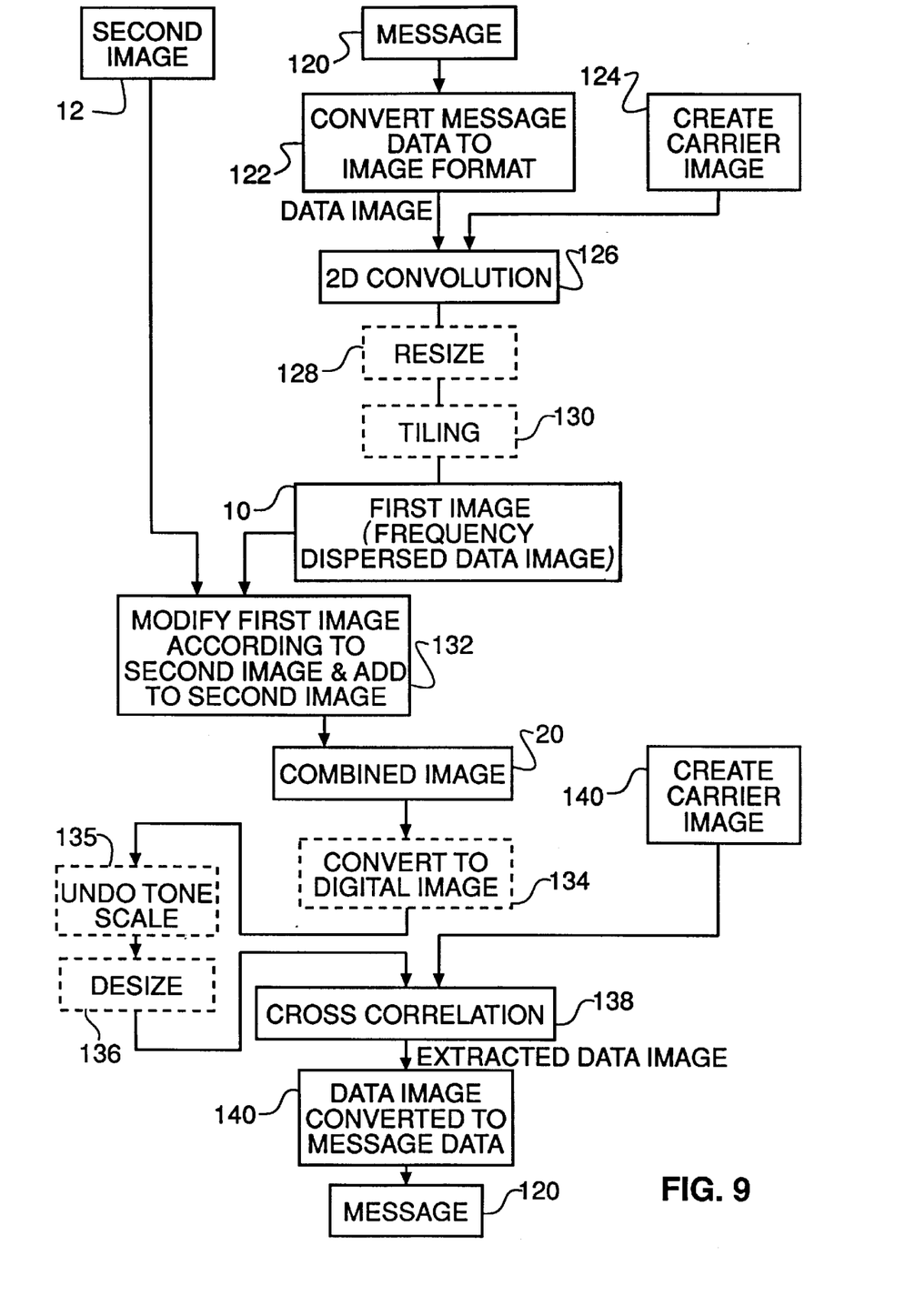
FIG. 9 is a block diagram of an application of the method of the present invention employed in data hiding.

Referring to FIG. 9, an application of the present invention in image hiding or steganography as described in the copending patent application U.S. Ser. No. 08/565,804, filed Nov. 30, 1995, by Scott J. Daly et al., will now be described. First, a message 120 to be hidden in a second image 12 is converted 122 to a multi-level 2-D data image. The multi-level data image is an image having a constant background value and an array of spots on the background representing the digital data. A carrier image is created 124. The encoding carrier image is preferably a rotationally symmetric (isotropic), low amplitude, high frequency pattern (e.g. a chirp signal or pseudorandom noise) employed to spatially disperse the data image to mask its visibility when added to the source image.

Next, the data image is convolved 126 with the encoding carrier image to form a frequency dispersed data image. Preferably the convolution 126 is performed on a digital computer using a well known Fourier Transform method and digital versions of the data image and the encoding carrier image. The convolution may also be performed using a direct convolution algorithm on the digital computer. Optionally, the frequency dispersed data image may be resized to a desired tile size 128 and the resized image may be repeated in a tiling fashion 130 to match the size of the second image 12. The resulting frequency dispersed data image takes the place of the first image 10 described previously. The first image 10 is then modified 132 according to the second image 12 and added to the second image according to the present invention to produce a combined image 20.

To recover the data image (first image) 10 from the combined image 20, the combined image is converted 134 to a digital image if necessary, for example by scanning, to create a digital version of the combined image 20.

The digitized version is then optionally processed 135 through the cone nonlinearity to return it to the domain where the modified first image and modified second image are added 18. This process will consist of the inverses of any steps performed after the addition 18 and prior to the final combined image 20. For example, in FIG. 2, an inverse cone nonlinearity 48 is applied after the addition, so at this optional step 135, the inverse of the inverse of the cone nonlinearity is required. This is simply the cone nonlinearity 34. In the method of FIG. 6, however, an inverse of the display MTF 100 and inverse display tone scale response 102 are applied as well as the inverse of the cone nonlinearity 48 after the addition 18 to arrive at a final combined image 20. Therefore the decoder for digital steganography should remove these effects by processing the digitized image through the display tone scale response, the display MTF and the cone nonlinearity. Although this step is optional, it acts to increase the signal to noise ratio of detecting the data message and is the preferred embodiment.

The combined image is then desized 136 to undo the resizing that was performed on the first image in step 128. The desized combined image is then cross correlated 138 with a carrier image created 140 in the same way as the carrier image that was created during the encoding step described above to generated an extracted data image. Finally, the two dimensional data image is converted 140 to a one dimensional data sequence representing the original message 120. Preferably, the digital data is converted from a digital version of the recovered data image using a pattern recognition process based on inverting the step 122 that was used to convert the message data to a 2-D data image.

Visually lossless image compression may also be thought of as hiding one image within another, where the error between the original image and the image reconstructed from the compressed image may be thought of as an error image. The reconstructed image is the combination of the error image and the original image. The goal of visually lossless compression is to insure that the reconstructed image is visually identical to the original image. This is equivalent to hiding the error image within the original image.

Figure 10:
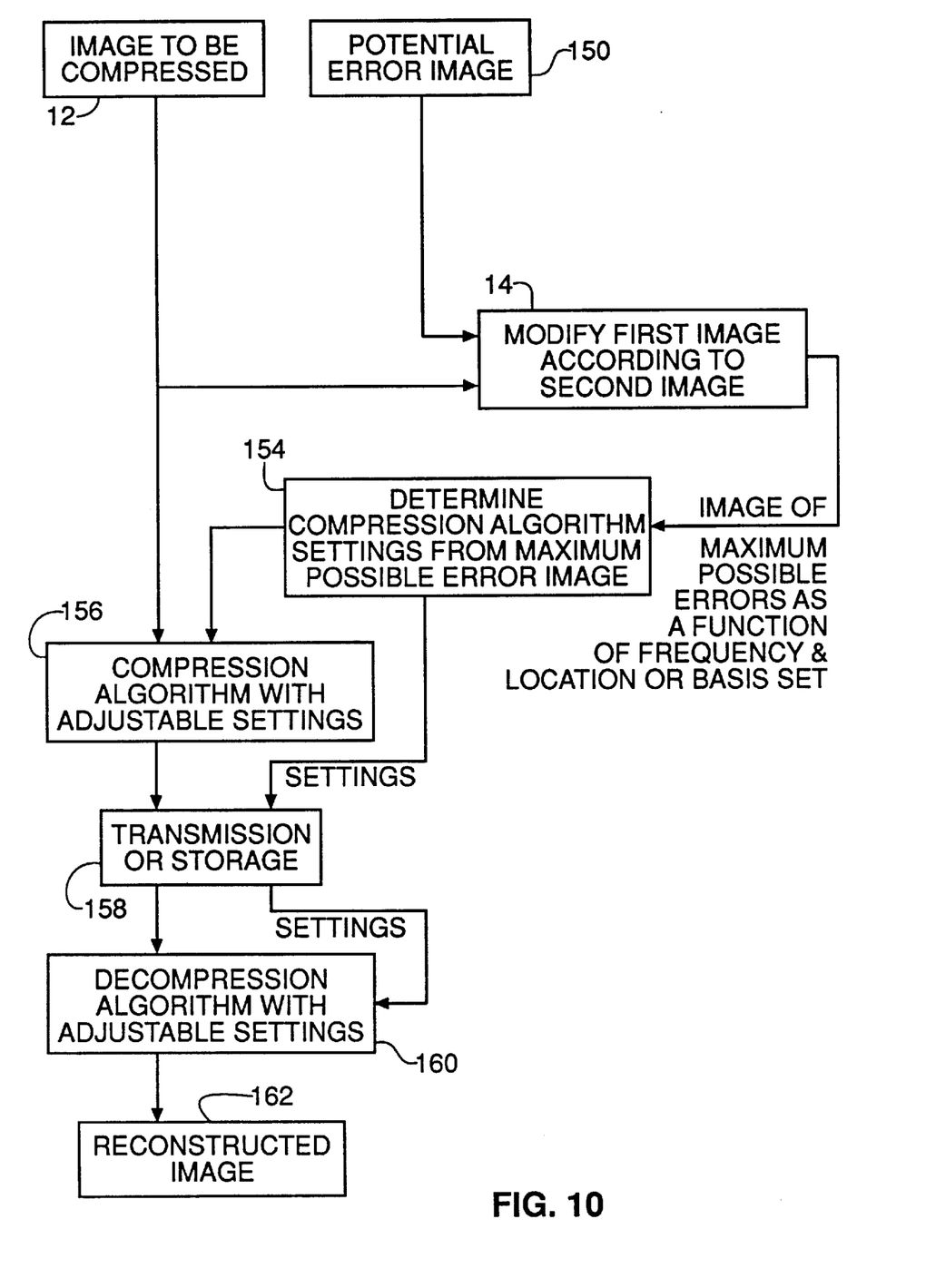
FIG. 10 is a block diagram of an application of the method of the present invention employed in image compression.

An example of how to implement visually lossless image compression according to the present invention will be described with reference to FIG. 10. An image to be compressed in an adaptive manner, referred to here as a second image 12, is input to an adaptive lossy compression algorithm, such as the adaptive discrete cosine transform (DCT) process described in U.S. Pat. No. 4,774,574 issued Sep. 27, 1988 to Daly et al., or an adaptive wavelet compression technique. A potential error image 150, comprising for example a uniformly textured image consisting of high contrast 2-D white noise or a high amplitude basis set derived from the particular compression algorithm (e.g. for DCT the basis set consists of rectangularly windowed cosine functions; for wavelets, the basis set consists of the basis functions which increase in size as the decomposition proceeds to lower frequency pyramid levels).

The potential error image 150 is used as the first image in step 14, which is modified according to the image to be compressed, i.e. the second image, so that the modified first image would not be visible if added to the second image 12. This modified first image represents the maximum allowable errors that may be introduced into the second image during compression without being visible. This maximum allowable error image is employed in step 154 to determine the compression algorithm parameters specific to the second image as a function of location and frequency. For example, in the DCT compression technique, the maximum allowable quantization for each coefficient in each block is determined from the maximum error image. One way of implementing this for the DCT method of compression is to first determine the DCT coefficients of the maximum error image for a corresponding block to be compressed. Next, the nominal quantization value used for each coefficient is scaled by a function of the DCT coefficient of the maximum error image. For example, the function may be a simple scale factor between 0.5 and 1.

The second image is then compressed 156 according to the adaptive compression algorithm whose parameters were selected in step 154. The compression algorithm parameters selected in step 154 are appended to the compressed image and the compressed image along with the compression parameters is stored or transmitted 158. Upon decompression 160 of the compressed image, the compression parameters are retrieved from the compressed image file and are employed by the decompression algorithm to produce a reconstructed second image 162 that is visually equivalent to the second image 12.

As noted above with reference to FIG. 1, the present invention may be implemented as a method or apparatus on a general purpose digital computer configured to perform image processing applications. Additionally, the invention may be implemented as a computer program product by storing a program for implementing the steps of the method on a computer readable storage medium. The storage medium may comprise for example; magnetic storage media such as magnetic disk (such as floppy disk) or magnetic tape; optical storage media such as optical disk, optical tape, or machine readable bar code; solid state electronic storage devices such as random access memory (RAM), or read only memory (ROM); or any other physical device or medium employed to store a digital computer program.

The invention has been described with reference to a preferred embodiment. However, it will be appreciated that variations and modifications can be effected by a person of ordinary skill in the art without departing from the scope of the invention.

PARTS LIST

10 first image
  12 second image
  14 modify image step
  16 modified first image
  18 add images step
  20 combined image
  22 scanner
  24 graphics work station
  26 digital image processor
  28 display device
  30 simulate display tone response step
  32 simulate display MTF step
  34 cone nonlinearity step
  36 CSF step
  38 simulate frequency decomposition step
  40 generate masking image step
  42 contrast attenuation step
  44 contrast accumulation step
  46 post filter inverse CSF step
  48 return images to physical domain step
  50 cortex filtered first image
  52 threshold elevation image
  54 phase uncertainty filter step
  56 compute maximum allowable local contrast step
  58 contrast normalization step
  60 compute absolute value step
  62 save sign step
  64 compare step
  66 assign value step
  68 assign maximum allowable local contrast step
  70 reapply saved sign step
  72 convert to spatial image units step
  74 phase uncertainty filter step
  76 assign value step
  78 contrast attenuated image
  80 contrast attenuated image
  82 contrast attenuated image
  84 contrast attenuated image
  86 contrast attenuated image
  88 accumulation step
  90 clipping step
  92 modified first image
  100 inverse display MTF step
  102 inverse display tone response step
  104 simulate display tone only step
  110 low-pass CSF step
  112 wavelet filter bank step
  114 low-pass inverse CSF step
  120 message
  122 converting a message to a data image step
  124 create carrier image step
  126 2-D convolution step
  128 resize step
  130 tiling step
  132 modify first image according to second image step
  134 convert hard copy to digital image step
  136 desize step
  138 cross correlation step
  140 create carrier image step 150 potential error image
154 determine compression algorithm settings step
156 compression step
158 store or transmit step
160 decompression step
162 reconstructed second image

What is claimed is:

1. A method of modifying a first image according to a second image so that the first image will not be visible when added to the second image, comprising the steps of:
   a) providing a human visual system model having a bank of spatial filters representing the responses of the human visual system to a plurality of frequencies;
   b) applying the spatial filters to the first and second images to produce first and second sets of spatial filtered images;
   c) employing the second set of spatial filtered images to determine a set of masking images representing the maximum possible distortions that can be added to the second image without being visible;
   d) employing the set of masking images to attenuate the contrast of the corresponding images in the first set of spatial filtered images to produce a set of contrast attenuated spatial filtered images; and
   e) accumulating the contrast attenuated spatial filtered images to produce the modified first image.

2. The method claimed in claim 1 employed in a method of hiding a first image in a second image, wherein the first image is an image representing a message, the second image is a pictorial image, and the modified first image is added to the second image to create a combined image that appears visually equivalent to the second image.

3. The method claimed in claim 1 employed in a lossy image compression method, wherein the first image is a potential error image resulting from the compression method, the second image is an image to be compressed, and the modified first image represents the maximum allowable error as a function of frequency and location in the compressed second image.

4. A method of hiding a first image in a second image to produce a combined image, comprising the steps of:
   a) modifying the first image according to the content of the second image, so that when the modified first image is added to the second image to produce the combined image, no visible differences will exist between the second image and the combined image, wherein the step of modifying the first image comprises the steps of:
      I) modifying the first and second images according to a display model having a tone scale response, clipping, MTF, and quantization components representing a display medium for displaying the combined image;
      ii) further modifying the first and second images according to a human visual system model having a cone nonlinearity function, a contrast sensitivity function, and a set of spatial frequency filters representing spatial dependencies of a visual system to produce a first and second set of filtered images;
      iii) employing the second set of spatial filtered images to determine a set of masking images representing the maximum possible distortions that can be added to the second image without being visible;
      iv) employing the set of masking images to attenuate the contrast of the corresponding images in the first set of spatial filtered images to produce a set of contrast attenuated spatial filtered images; and
      v) accumulating the contrast attenuated spatial filtered images to produce the modified first image;
      vi) further modifying the modified image by the inverse of the contrast sensitivity function; and
   b) adding the modified first image to the second image to produce the combined image, wherein the step of adding the modified first image to the second image further comprises the steps of:
      I) modifying the second image by the display model tone scale response and MTF and cone nonlinearity function;
      ii) summing the modified first image with the modified second image to produce a combined image; and
      iii) further modifying the combined image by the inverse of the cone nonlinearity.

5. The method claimed in claim 4, wherein:
   a) the step of modifying the first image comprises the steps of:
      i) modifying the second image according to a display model having a tone scale response, clipping, MTF, and quantization components representing a display medium for displaying the combined image;
      ii) further modifying the second image according to a human visual system model having a cone nonlinearity function, a contrast sensitivity function, and a set of spatial frequency filters representing spatial dependencies of a visual system to produce a first and second set of filtered images;
      iii) employing the second set of spatial filtered images to determine a set of masking images representing the maximum possible distortions that can be added to the second image without being visible;
      iv) employing the set of masking images to attenuate the contrast of the corresponding images in the first set of spatial filtered images to produce a set of contrast attenuated spatial filtered images; and
      v) accumulating the contrast attenuated spatial filtered images to produce the modified first image;
      vi) further modifying the modified image by the inverse of the contrast sensitivity function; and
   b) the step of adding the modified first image to the second image further comprises the steps of:
      i) modifying the second image by the display model tone scale response and MTF and cone nonlinearity function;
      ii) summing the modified first image with the second image to produce a combined image; and
      iii) further modifying the combined image by the inverse of the cone nonlinearity and the inverse of the display tone scale response.

6. The method claimed in claim 4, wherein:
   a) the step of modifying the first image comprises the steps of:
      i) modifying the second image according to a display model having a tone scale response, clipping, MTF, and quantization components representing a display medium for displaying the combined image;
      ii) further modifying the second image according to a human visual system model having a cone nonlinearity function, a contrast sensitivity function, and a set of spatial frequency filters representing spatial dependencies of a visual system to produce a first and second set of filtered images;
      iii) employing the second set of spatial filtered images to determine a set of masking images representing the maximum possible distortions that can be added to the second image without being visible;

iv) employing the set of masking images to attenuate the contrast of the corresponding images in the first set of spatial filtered images to produce a set of contrast attenuated spatial filtered images; and v) accumulating the contrast attenuated spatial filtered images to produce the modified first image;

vi) further modifying the modified image by the inverse of the contrast sensitivity function; and b) the step of adding the modified first image to the second image further comprises the steps of:

i) modifying the second image by the display tone scale response and the cone nonlinearity to produce a modified second image;

ii) summing the modified first image with the modified second image to produce a combined image;

iii) further modifying the combined image by the inverse of the cone nonlinearity and the inverse of the display tone scale response.

7. The method claimed in claim 4, wherein:

the step of modifying the first image comprises the steps of:

a) modifying the second image with a low pass filter representing a contrast sensitivity function of the human visual system;

b) modifying the first image and further modifying the second image according to a set of spatial frequency filters representing spatial dependencies of a visual system to produce a first and second set of filtered images;

c) employing the second set of spatial filtered images to determine a set of masking images representing the maximum possible distortions that can be added to the second image without being visible;

d) employing the set of masking images to attenuate the contrast of the corresponding images in the first set of spatial filtered images to produce a set of contrast attenuated spatial filtered images;

e) accumulating the contrast attenuated spatial filtered images to produce the modified first image; and f) further modifying the modified image by the inverse of the low pass filter representing a contrast sensitivity function of the human visual system.

8. Apparatus for modifying a first image according to a second image so that the first image will not be visible when added to the second image, comprising:

a) a bank of spatial filters representing the responses of the human visual system to a plurality of frequencies;

b) means for applying the spatial filters to the first and second images to produce first and second sets of spatial filtered images;

c) means responsive to the second set of spatial filtered images for determining a set of masking images representing the maximum possible distortions that can be added to the second image without being visible;

d) means responsive to the set of masking images for attenuating the contrast of the corresponding images in the first set of spatial filtered images to produce a set of contrast attenuated spatial filtered images; and e) means for accumulating the contrast attenuated spatial filtered images to produce the modified first image.

9. The apparatus claimed in claim 8, employed in apparatus for hiding a first image in a second image, wherein the first image is an image representing a message, the second image is a pictorial image, and further comprising means for adding the modified first image to the second image to create a combined image that appears visually equivalent to the second image.

10. The apparatus claimed in claim 8 employed in a lossy image compression apparatus, wherein the first image is a potential error image resulting from the lossy image compression, the second image is an image to be compressed, and the modified first image represents the maximum allowable error as a function of frequency and location in the compressed second image.

11. Apparatus for hiding a first image in a second image to produce a combined image, comprising:

a) means for modifying the first image according to the content of the second image, so that when the modified first image is added to the second image to produce the combined image, no visible differences will exist between the second image and the combined image, wherein the means for modifying the first image comprises:

I) means for modifying the first and second images according to a display model having a tone scale response clipping, MTF, and quantization components representing a display medium for displaying the combined image;

ii) means for further modifying the first and second images according to a human visual system model having a cone nonlinearity function, a contrast sensitivity function, and a set of spatial frequency filters representing spatial dependencies of a visual system to produce a first and second set of filtered images;

iii) means responsive to the second set of spatial filtered images for determining a set of masking images representing the maximum possible distortions that can be added to the second image without being visible;

iv) means responsive to the set of masking images for attenuating the contrast of the corresponding images in the first set of spatial filtered images to produce a set of contrast attenuated spatial filtered images; and v) means for accumulating the contrast attenuated spatial filtered images to produce the modified first images;

vi) means for further modifying the modified image by the inverse of the contrast sensitivity function; and b) means for adding the modified first image to the second image to produce the combined image, wherein the means for adding the modified first image to the second image further comprises:

I) means for modifying the second image by the display model tone scale response and MTF and cone nonlinearity function;

ii) means for summing the modified first image with the modified second image to produce a combined image; and iii) means for further modifying the combined image by the inverse of the cone nonlinearity.

12. The apparatus claimed in claim 11, wherein:

a) the means for modifying the first image comprises:

i) means for modifying the second image according to a display model having a tone scale response, clipping, MTF, and quantization components representing a display medium for displaying the combined image;

ii) means for further modifying the second image according to a human visual system model having a cone nonlinearity function, a contrast sensitivity function, and a set of spatial frequency filters representing spatial dependencies of a visual system to produce a first and second set of filtered images;

iii) means responsive to the second set of spatial filtered images for determining a set of masking images representing the maximum possible distortions that can be added to the second image without being visible;

iv) means responsive to the set of masking images for attenuating the contrast of the corresponding images in the first set of spatial filtered images to produce a set of contrast attenuated spatial filtered images;

v) means for accumulating the contrast attenuated spatial filtered images to produce the modified first image;

vi) means for further modifying the modified image by the inverse of the contrast sensitivity function; and b) the means for adding the modified first image to the second image further comprises:

i) means for modifying the second image by the display model tone scale responding MTF and cone nonlinearity function;

ii) means for summing the modified first image with the second image to produce a combined image; and iii) means for further modifying the combined image by the inverse of the cone nonlinearity and the inverse of the display tone scale response.

13. The apparatus claimed in claim 11, wherein:

a) the means for modifying the first image comprises:

i) means for modifying the second image according to a display model having a tone scale response, clipping, MTF, and quantization components representing a display medium for displaying the combined image;

ii) means for further modifying the second image according to a human visual system model having a cone nonlinearity function, a contrast sensitivity function, and a set of spatial frequency filters representing spatial dependencies of a visual system to produce a first and second set of filtered images;

iii) means responsive to the second set of spatial filtered images for determining a set of masking images representing the maximum possible distortions that can be added to the second image without being visible;

iv) means responsive to the set of masking images for attenuating the contrast of the corresponding images in the first set of spatial filtered images to produce a set of contrast attenuated spatial filtered images; and v) means for accumulating the contrast attenuated spatial filtered images to produce the modified first image;

vi) means for further modifying the modified image by the inverse of the contrast sensitivity function; and b) the means for adding the modified first image to the second image further comprises the steps of:

i) means for modifying the second image by the display tone scale response and the cone nonlinearity to produce a modified second image;

ii) means for summing the modified first image with the modified second image to produce a combined image; and iii) means for further modifying the combined image by the inverse of the cone nonlinearity and the inverse of the display tone scale response.

14. The apparatus claimed in claim 11, wherein:

the means for modifying the first image comprises:

a) means for modifying the second image with a low pass filter representing a contrast sensitivity function of the human visual system;

b) means for modifying the first image and further modifying the second image according to a set of spatial frequency filters representing spatial dependencies of a visual system to produce a first and second set of filtered images;

c) means responsive to the second set of spatial filtered images for determining a set of masking images representing the maximum possible distortions that can be added to the second image without being visible;

d) means responsive to the set of masking images for attenuating the contrast of the corresponding images in the first set of spatial filtered images to produce a set of contrast attenuated spatial filtered images;

e) means for accumulating the contrast attenuated spatial filtered images to produce the modified first image; and f) means for further modifying the modified image by the inverse of the low pass filter representing a contrast sensitivity function of the human visual system.

15. A computer program product for modifying a first image according to a second image so that the first image will not be visible when added to the second image, comprising a computer readable storage medium having a computer program stored thereon for performing the steps of:

a) providing a human visual system model having a bank of spatial filters representing the responses of the human visual system to a plurality of frequencies;

b) applying the spatial filters to the first and second images to produce first and second sets of spatial filtered images;

c) employing the second set of spatial filtered images to determine a set of masking images representing the maximum possible distortions that can be added to the second image without being visible;

d) employing the set of masking images to attenuate the contrast of the corresponding images in the first set of spatial filtered images to produce a set of contrast attenuated spatial filtered images; and e) accumulating the contrast attenuated spatial filtered images to produce the modified first image.

16. The computer program product claimed in claim 15 employed in a method of hiding a first image in a second image, wherein the first image is an image representing a message, the second image is a pictorial image, and the modified first image is added to the second image to create a combined image that appears visually equivalent to the second image.

17. The computer program product claimed in claim 15 employed in a lossy image compression method, wherein the first image is a potential error image resulting from the compression method, the second image is an image to be compressed, and the modified first image represents the maximum allowable error as a function of frequency and location in the compressed second image.

18. A computer program product for hiding a first image in a second image to produce a combined image, comprising a computer readable storage medium having a computer program stored thereon for performing the steps of:

a) modifying the first image according to the content of the second image, so that when the modified first image is added to the second image to produce the combined image, no visible differences will exist between the second image and the combined image, wherein the step of modifying the first image comprises the steps of:

I) modifying the first and second images according to a display model having a tone scale response, clipping, MTF, and quantization components representing a display medium for displaying the combined image;

ii) further modifying the first and second images according to a human visual system model having a cone nonlinearity function, a contrast sensitivity function, and a set of spatial frequency filters representing spatial dependencies of a visual system to produce a first and second set of filtered images;

iii) employing the second set of spatial filtered images to determine a set of masking images representing the maximum possible distortions that can be added to the second image without being visible;

iv) employing the set of masking images to attenuate the contrast of the corresponding images in the first set of spatial filtered images to produce a set of contrast attenuated spatial filtered images; and v) accumulating the contrast attenuated spatial filtered images to produce the modified first image;

vi) further modifying the modified image by the inverse of the contrast sensitivity function; and b) adding the modified first image to the second image to produce the combined image, wherein the step of adding the modified first image to the second image further comprises the steps of:

I) modifying the second image by the display model tone scale response and MTF and cone nonlinearity function;

ii) summing the modified first image with the modified second image to produce a combined image; and iii) further modifying the combined image by the inverse of the cone nonlinearity.

19. The computer program product claimed in claim 18, wherein:

a) the step of modifying the first image comprises the steps of:

i) modifying the second image according to a display model having a tone scale response, clipping, MTF, and quantization components representing a display medium for displaying the combined image;

ii) further modifying the second image according to a human visual system model having a cone nonlinearity function, a contrast sensitivity function, and a set of spatial frequency filters representing spatial dependencies of a visual system to produce a first and second set of filtered images;

iii) employing the second set of spatial filtered images to determine a set of masking images representing the maximum possible distortions that can be added to the second image without being visible;

iv) employing the set of masking images to attenuate the contrast of the corresponding images in the first set of spatial filtered images to produce a set of contrast attenuated spatial filtered images; and v) accumulating the contrast attenuated spatial filtered images to produce the modified first image;

vi) further modifying the modified image by the inverse of the contrast sensitivity function; and b) the step of adding the modified first image to the second image further comprises the steps of:

i) modifying the second image by the display model tone scale response and MTF and cone nonlinearity function;

ii) summing the modified first image with the second image to produce a combined image; and iii) further modifying the combined image by the inverse of the cone nonlinearity and the inverse of the display tone scale response.

20. The computer program product claimed in claim 18, wherein:

a) the step of modifying the first image comprises the steps of:

i) modifying the second image according to a display model having a tone scale response, clipping, MTF, and quantization components representing a display medium for displaying the combined image;

ii) further modifying the second image according to a human visual system model having a cone nonlinearity function, a contrast sensitivity function, and a set of spatial frequency filters representing spatial dependencies of a visual system to produce a first and second set of filtered images;

iii) employing the second set of spatial filtered images to determine a set of masking images representing the maximum possible distortions that can be added to the second image without being visible;

iv) employing the set of masking images to attenuate the contrast of the corresponding images in the first set of spatial filtered images to produce a set of contrast attenuated spatial filtered images; and v) accumulating the contrast attenuated spatial filtered images to produce the modified first image;

vi) further modifying the modified image by the inverse of the contrast sensitivity function; and b) the step of adding the modified first image to the second image further comprises the steps of:

i) modifying the second image by the display tone scale response and the cone nonlinearity to produce a modified second image;

ii) summing the modified first image with the modified second image to produce a combined image;

iii) further modifying the combined image by the inverse of the cone nonlinearity and the inverse of the display tone scale response.

21. The computer program product claimed in claim 18, wherein: the step of modifying the first image comprises the steps of:

a) modifying the second image with a low pass filter representing a contrast sensitivity function of the human visual system;

b) modifying the first image and further modifying the second image according to a set of spatial frequency filters representing spatial dependencies of a visual system to produce a first and second set of filtered images;

c) employing the second set of spatial filtered images to determine a set of masking images representing the maximum possible distortions that can be added to the second image without being visible;

d) employing the set of masking images to attenuate the contrast of the corresponding images in the first set of spatial filtered images to produce a set of contrast attenuated spatial filtered images;

e) accumulating the contrast attenuated spatial filtered images to produce the modified first image; and f) further modifying the modified image by the inverse of the low pass filter representing a contrast sensitivity function of the human visual system.

22. The method claimed in claim 4, wherein the step of attenuating the contrast of the first image further comprises the steps of:

a) computing absolute values of the images in the first set of spatial filtered images to produce a set of absolute value images;

b) low pass filtering the set of absolute value images to produced a set of filtered images;

c) multiplying each image in the set of absolute value images by the corresponding masking image to produce product images; and d) dividing each of the product images by the corresponding filtered image.

* * * * *